C. PICKRING.
SMOKE STACK.
(Application filed Oct. 5, 1897.)
No. 11,686. Reissued Aug. 2, 1898.
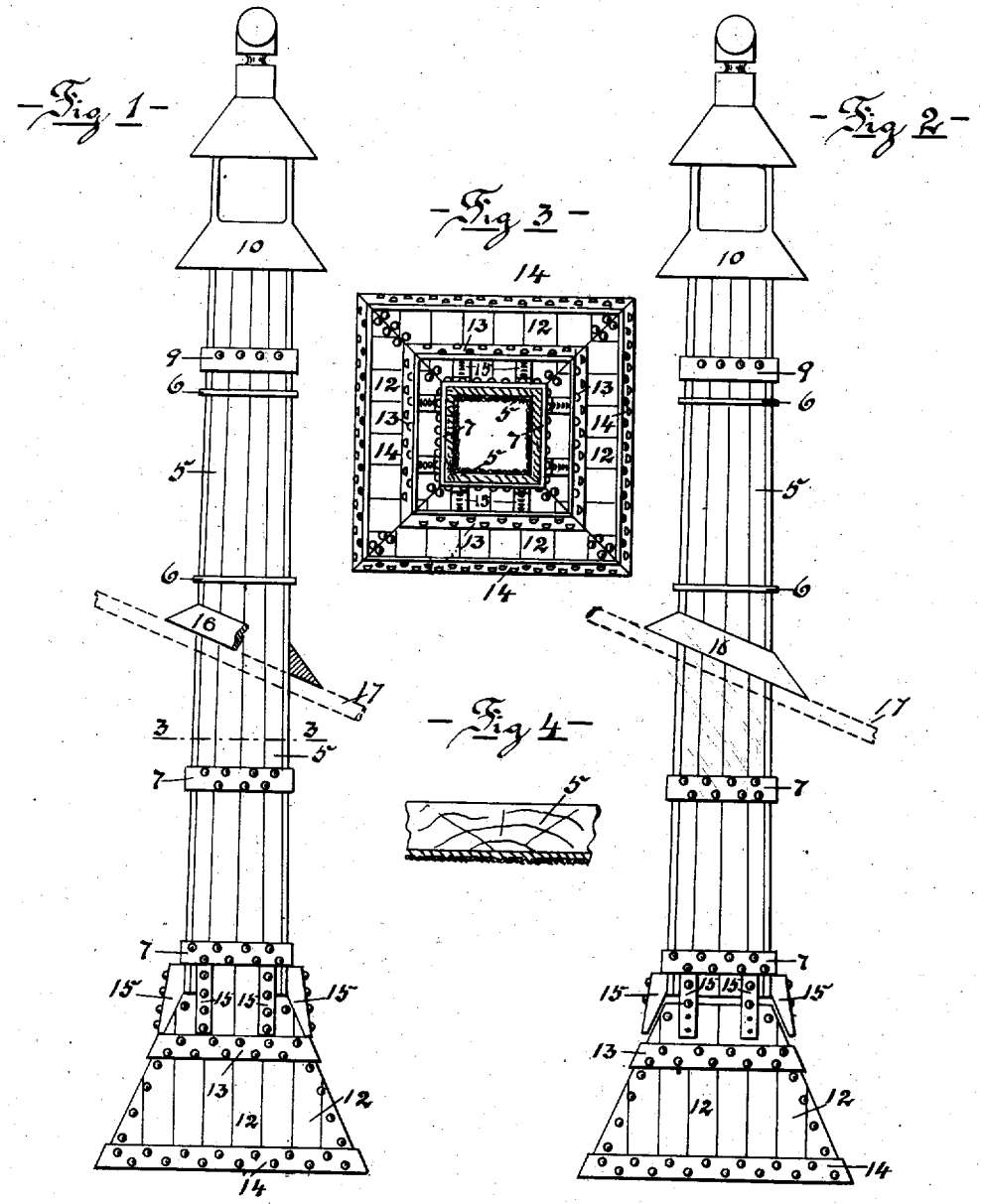
Witnesses
Frederick E. Appley
Axel Y. Beeken
Inventor
Charles Pickring
by his Attorneys
Gallagher & Richards

UNITED STATES PATENT OFFICE.

CHARLES PICKRING, OF RICHMOND, CANADA, ASSIGNOR TO THE LAPPIN BRAKE SHOE COMPANY, OF BLOOMFIELD, NEW JERSEY.

SMOKE-STACK.

SPECIFICATION forming part of Reissued Letters Patent No. 11,686, dated August 2, 1898.

Original No. 570,144, dated October 27, 1896. Application for reissue filed October 5, 1897. Serial No. 654,195

*To all whom it may concern:*

Be it known that I, CHARLES PICKRING, of Richmond, in the county of Richmond and Province of Quebec, Canada, have invented certain new and useful Improvements in Smoke-Stacks; and I do hereby declare that the following is a full, clear, and exact description of the same.

My invention relates more particularly to smoke-stacks for locomotive running-sheds or roundhouses, although it is equally applicable as a smoke-stack or chimney for any form of building, especially where adjustable smoke-stacks are required.

Smoke-stacks especially intended for roundhouses are at present almost universally constructed either of iron, steel, or tile. The disadvantages connected with or incident to the use of iron or steel smoke-stacks are that it is practically impossible to keep them so fully protected that the steam and acid gases escaping from the locomotives below the stacks will not act upon the metal of the stack and gradually eat it away or dissolve it. This not only quickly destroys the stack, making it very short-lived, but also the steam condensing on the metal stack causes an acid drip from the stack which runs down upon the locomotive below and damages its metal work. When tile is used in the manufacture of these stacks, the corrosion that occurs when iron or steel is used is obviated, but the tile causes a rapid condensation of the steam on the sides of the stack and this causes an acid drip as in the case of iron or steel stacks. An additional objection to the use of these tile stacks is their weight, which practically prevents the use of a long stack and renders them non-adjustable and ill adapted to the kind of roof usually used on roundhouses. They are also liable to break and do not afford a good draft. The requisites of a perfect stack for roundhouses or running-sheds are that it shall be light in weight, thus enabling the use of a high stack where that is necessary to obtain a good draft, that it shall be readily adjustable to different heights, so as to accommodate locomotives of different heights of smoke-stack, that it shall afford a good draft, so as to completely carry away the smoke, steam, and fumes from the locomotive below, that it shall be fireproof, that it shall be acid-proof, that is not liable to be attacked and eaten away by the acids present in the fumes from the locomotives, that it shall be of such material as to prevent, as far as possible, the condensation of the steam on its inner surface, thus preventing a drip from the stack, and that it shall be durable, cheap, and easy to erect and keep in repair.

My invention has for its object to provide a smoke-stack primarily for roundhouses or running-sheds that shall possess all of these desirable features. To accomplish this object I construct my smoke-stack of wood or other similar light material, coat the inside face of the stack with sand or other vitrifiable material caused to adhere thereto, prefefably by first painting the said inside face of the stack and then applying sand to the painted surface while the paint is wet. This combination of paint and sand when subjected to the action of the gases, smoke, and heat passing through the stack becomes gradually petrified or converted into a stony hardness, affording considerable resistance to a cutting instrument, such as a knife or saw, and forms an absolutely fireproof coat or layer on the inside surface of the stack, thus allowing the use of combustible material, such as wood or other similar light and cheap material, in the construction of the stack or chimney.

By means of my use of wood or other similar light material in the construction of my stack I am enabled to make it of any length that may be required in order to obtain a good draft without overburdening the roof on which it rests and to make it adjustable to different heights, so that it may be adapted to different heights of the locomotive smoke-stacks below.

I so construct the stack that it extends from below the roof-line up through an aperture in the roof, and I hold the stack in any desired position by means of the movable straps or cleats 16, which can readily be attached to the smoke-stack by means of screws or clamps at any desired point and, resting upon the roof of the roundhouse, hold the stack in the desired position. This I have shown in Figs. 1 and 2 of my drawings, where 16 represents the movable strap or cleat, and 17 the roof upon which it rests. These straps or cleats 16 not only hold the stack in place, but also serve to cover up cracks or openings between the stack and the roof and prevent the entrance of rain. While I prefer this simple method of adjusting the stack, of course it may be adjusted in many other ways, and I do not wish to limit myself to any particular means of adjusting.

The use of wood also enables me to make my smoke-stack practically acid-proof, for the wood is not injured for the purpose for which it is used by the attack of the acids in the fumes from the locomotives, and the protective coating also protects it, and even if it be attacked in some slight degree the attack does not result in dissolving the wood.

By the use of a wooden smoke-stack I am enabled to procure a much better draft than can be obtained where iron and steel stacks are used, as the wood being a poor conductor of heat the hot air and smoke passing up through the stack are not chilled during the passage, and for the same reason the steam is not liable to condense on its sides and produce a drip, as is the case where iron or steel is used.

The use of wood also makes the stack much more durable than iron or steel stacks, for the wood hardens under the conditions of its use and becomes almost indestructible, whereas the iron and steel is not only attacked by the acids, but oxidizes and decomposes by exposure to the weather. In addition to this wood is much cheaper as a material for stacks than either iron, steel, or tile, is much more easily kept in repair, and easily handled.

The invention may be said, further, to consist in the special construction of the stack and forming the top of same adjustable and tapered toward its upper end, as more particularly hereinafter described and claimed.

For full comprehension, however, of the invention reference must be had to the accompanying drawings, forming a part of this specification, in which like symbols indicate the same parts, and wherein—

Figure 1 is a side elevation of my improved smoke-stack or chimney; Fig. 2, a similar view thereof, but with its sections separated for purposes of illustration; Fig. 3, a transverse horizontal sectional view taken on line 3 3, Fig. 1; and Fig. 4, a similar view to Fig. 3, but only of a portion thereof enlarged.

I consider it advantageous for many reasons to construct the smoke-stack or chimney in sections—viz., a body-section, a top section, and a flared bottom section, all secured together in any suitable manner.

The body-section is preferably tapered toward its upper end and is formed of a series of tapered strips 5, of wood, bound together by bands 6, preferably of iron and movable, and bands 7, preferably of wood, thus forming a rectangular conduit tapering slightly from one end to the other, and the inside face thereof is coated with sand by first painting such inside face and then applying the sand while the paint is wet. This may be done to each strip of wood before they are bound together, but preferably when the parts are formed in two halves ready to be put together.

The top section is constructed similarly to the body-section, except that it is straight throughout its length and has a band 9, of extended width and preferably of wood, secured to and adapted to project beyond the lower end thereof in order to receive the upper end of the body-section. The upper end of this top section may be furnished with any desired form of chimney-jack 10, of any length.

The bottom section is also preferably constructed similarly to the body-section, excepting that it is tapered outward from the top to the bottom thereof and to a much greater extent than such body-section, and the strips 12 thereof are bound together by bands 13 and 14, preferably of wood, these last-mentioned sections being preferably secured together by means of strips 15, each secured at one end to the bottom of the body-section and their other ends adapted to fit over and be secured to the upper end of the bottom section.

It will be obvious that the smoke-stack or chimney can be made in one piece, if desired, and of any desired shape or of any suitable material and many other changes made without departing from the spirit of my invention.

What I claim is as follows:

1. A smoke-stack or chimney having its inside face coated with sand, for the purpose set forth.

2. A smoke-stack or chimney formed of a combustible material presenting an approximately smooth inside surface and such surface coated with a petrifiable material, for the purpose set forth.

3. A smoke-stack or chimney formed of wood presenting an approximately smooth inside surface and such surface coated with a petrifiable material for the purpose set forth.

4. A smoke-stack or chimney formed of a combustible material and coated on its inside surface with sand, for the purpose set forth.

5. A smoke-stack or chimney formed of wood and coated on its inside surface with sand, for the purpose set forth.

6. A smoke-stack or chimney formed of wood and coated on its inside surface with paint and sand, for the purpose set forth.

7. A smoke-stack or chimney formed of a combustible material fireproofed on its inside surface and provided with means for adjustment to any desired height.

8. A smoke-stack or chimney formed of a combustible material coated with a fire and acid proof substance on its inside surface and provided with means for adjustment to any desired height.

9. A smoke-stack or chimney formed of wood, fireproofed on its inside surface and provided with means for adjustment at any desired height.

10. A smoke-stack or chimney rectangular in cross-section and formed of a number of parallel wood boards with transverse straps holding same together, and coated on its inside surface with petrifiable material, for the purpose set forth.

11. A wood smoke-stack comprising a body-section, top section and flared bottom section with its inside surface fireproofed, for the purpose set forth.

12. A wood smoke-stack rectangular in cross-section and comprising a body-section, top section and flared bottom section with its inside surface fireproofed, for the purpose set forth.

13. A wood smoke-stack rectangular in cross-section comprising a body-section, top section and flared bottom section with strips 15 for connecting the last-named sections together, for the purpose set forth.

14. A wood smoke-stack rectangular in cross-section comprising a body-section, top section and flared bottom section formed of a number of parallel wood boards with transverse straps holding same together, the top section overlapping the body-section and strips 15 for connecting the body and bottom sections together, for the purpose set forth.

CHARLES PICKRING.

Witnesses:
W. F. NELSON,
S. FRASER.